United States Patent
Yeh et al.

(10) Patent No.: US 8,755,180 B2
(45) Date of Patent: Jun. 17, 2014

(54) FOLDABLE ELECTRIC DEVICE

(75) Inventors: Shu-Hua Yeh, New Taipei (TW);
Chi-Fu Chen, Taoyuan Shien (TW);
Fang-Hsiang Tseng, Taoyuan Shien (TW); Chun-Cheng Lin, Taoyuan Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 325 days.

(21) Appl. No.: 13/431,235

(22) Filed: Mar. 27, 2012

(65) Prior Publication Data

US 2013/0016460 A1    Jan. 17, 2013

(30) Foreign Application Priority Data

Jul. 14, 2011   (TW) .............................. 100212954 U

(51) Int. Cl.
*G06F 1/16*    (2006.01)
(52) U.S. Cl.
CPC .................................... *G06F 1/1679* (2013.01)
USPC ................................. 361/679.55; 361/679.01
(58) Field of Classification Search
CPC .... G06F 1/1675; G06F 1/1618; G06F 1/1679
USPC ........................ 361/679.01, 679.55
See application file for complete search history.

(56) References Cited

U.S. PATENT DOCUMENTS

| | | | | |
|---|---|---|---|---|
| 7,261,331 | B2 * | 8/2007 | Lin | 292/116 |
| 8,331,089 | B2 * | 12/2012 | Tseng | 361/679.55 |
| 2008/0158800 | A1 * | 7/2008 | Aoyagi | 361/681 |
| 2010/0046149 | A1 * | 2/2010 | Wang et al. | 361/679.01 |
| 2010/0315764 | A1 * | 12/2010 | Tseng | 361/679.01 |
| 2011/0026203 | A1 * | 2/2011 | Ligtenberg et al. | 361/679.01 |
| 2012/0069502 | A1 * | 3/2012 | Lauder et al. | 361/679.01 |
| 2012/0069503 | A1 * | 3/2012 | Lauder et al. | 361/679.01 |
| 2012/0229962 | A1 * | 9/2012 | Chen et al. | 361/679.01 |

* cited by examiner

*Primary Examiner* — Lisa Lea Edmonds
(74) *Attorney, Agent, or Firm* — Rabin & Berdo, P.C.

(57) ABSTRACT

A foldable electric device comprises a first member, a second member and a pivot portion. The pivot portion is used to pivot the first member and the second member. The first member comprises a first cushion pad and a first magnetic component. The first cushion pad is retractably disposed on a surface of the first member. The first magnetic component is installed in the first member, and synchronously moves with the first cushion pad. The second member comprises a second magnetic component. When the first member and the second member are covered together, with the magnetic effect between the first magnetic component and the second magnetic component, the first cushion pad is linked by the first magnetic unit to protrude from or retract into the first member.

10 Claims, 11 Drawing Sheets

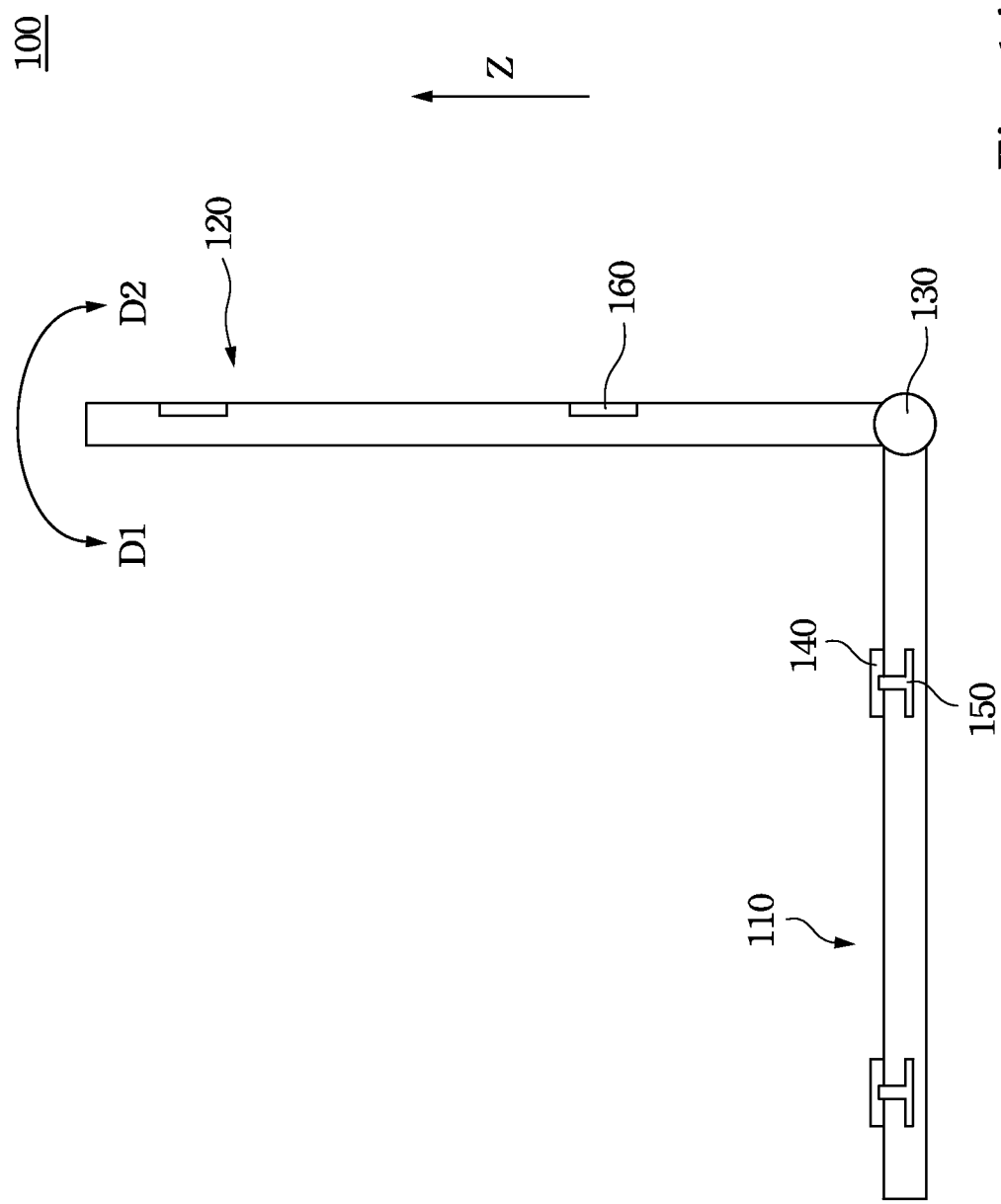

FOLDABLE ELECTRIC DEVICE

RELATED APPLICATIONS

This application claims priority to Taiwanese Application Serial Number 100212954, filed Jul. 14, 2011, which is herein incorporated by reference.

BACKGROUND

1. Technical Field

The present invention relates to a portable computer, more particular to a portable computer having movable cushion pads.

2. Description of Related Art

The portable computer, e.g. a notebook computer, is one of the most popular products in the electronic device market. Because the development of notebook computer is getting matured, a consumer now pays more attention on the appearance design or the convenience in use, instead of the calculation capability of the computer itself, when the user would like to choose a portable computer.

The top chassis and the bottom chassis of a notebook computer are pivotally connected with each other, and the top chassis and the bottom chassis can be rotated to cover one another. The bottom chassis has a keyboard surface and a placement surface opposite to the keyboard surface. The bottom chassis is further provided with at least a cushion pad. When the cushion pad is fixedly disposed on the keyboard surface, the cushion pad can minify the excessive-exerted force that the top chassis is slammed on the bottom chassis; when the cushion pad is fixedly disposed on the placement surface, the cushion pad can minify the excessive-exerted force that the bottom chassis is thrown on a table surface. Moreover, the top chassis and the bottom chassis can relatively rotate 360 degree, such that the keyboard surface of the bottom chassis is opposite to a screen surface of the top chassis.

However, no matter the top chassis and the bottom chassis are mutually rotated to open and close themselves, the cushion pad still exists on each surface of the bottom chassis, thereby causing inconvenience when being carried around.

In view of the mention disadvantages, it still needs for improvement of the portable computer.

SUMMARY

The present invention is to provide a foldable electric device, wherein a top chassis and bottom chassis of the foldable electric device are covered with each other, the cushion pad can be automatically protrude outwardly or retract inwardly.

According to the first embodiment of the present invention, the foldable electric device comprises a first member, a second member and a pivot portion.

The first member comprises a first chassis, a first cushion pad and a first magnetic component. The first cushion is retractable disposed on a surface of the second chassis. The first magnetic component is installed in the first chassis, and linked by the first cushion pad to synchronously move. The second member comprises a second chassis and a second magnetic component. The second magnetic component is installed in the second member. The pivot portion is used to pivot the first chassis and the second chassis. When the first chassis and the second chassis are covered with each other, with the magnetic effect between the first magnetic component and the second magnetic component, the first cushion pad is driven by the first magnetic component to protrude from or retract into the surface of the first chassis.

As what is disclosed above, the foldable electric device provided by the present invention utilizes the theory of magnetism attracting or repelling to enable the first cushion pad and the second cushion pad to synchronously protrude from or retract into the surface of the first chassis, when the first chassis and the second chassis are covered with each other, thereby providing convenience of holding or carrying the foldable electric device.

BRIEF DESCRIPTION OF THE DRAWINGS

The present invention will be apparent to those skilled in the art by reading the following detailed description of a preferred embodiment thereof, with reference to the attached drawings, in which:

FIG. 1A is a schematic view showing the unfolding state of the foldable electric device, according to the first embodiment of the present invention;

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1B:
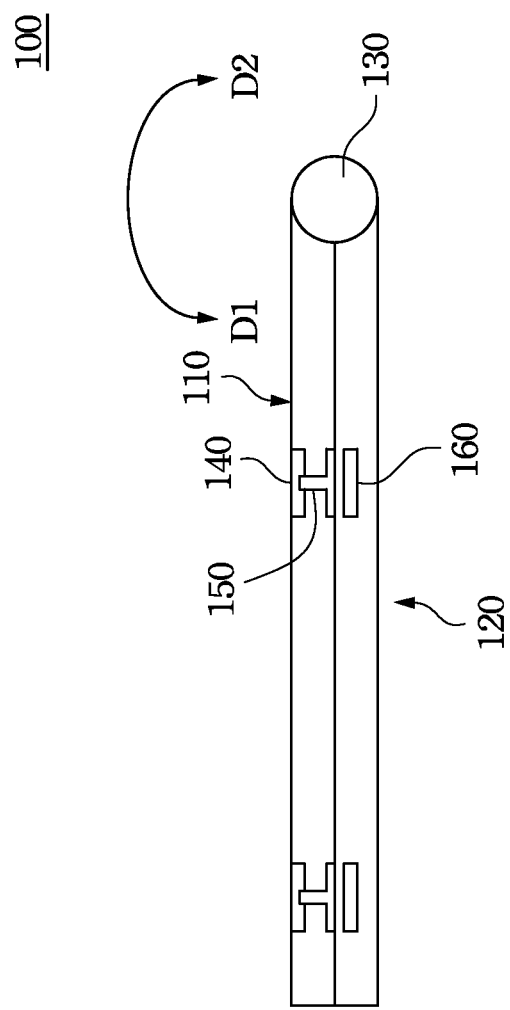
FIG. 1B is a schematic view showing the folding state of the foldable electric device, according to the first embodiment of the present invention.

Referring to FIG. 1A and FIG. 1B, wherein FIG. 1A is a schematic view showing the unfolding state of the foldable electric device, according to the first embodiment of the present invention; and FIG. 1B is a schematic view showing the folding state of the foldable electric device, according to the first embodiment of the present invention.

The foldable electric device 100 provided by the present invention comprises a first member 110, a second member1 120 and a pivot member 130. The pivot member 130 is used to pivot the first member 110 and the second member 120. As such, the second member 120 is enabled to pivotally rotate to cover on or leave away from the first member 110.

Substantially, the second member 120 can be pivotally rotated in the counterclockwise direction (D1) for forwardly covering on a top surface of the first member 110 (not shown in figures), or the second member 120 can be pivotally rotated in the clockwise direction (D2) for reversely covering on a bottom surface of the first member 110 (as shown in FIG. 1B).

The first member 110 at least has a cushion pad 140 and a first magnetic component 150. The cushion pad 140 is retractably disposed on a surface of the first member 110, so the cushion pad 140 can moveably protrude from or retract into the surface of the first member 110. The first magnetic component 150 is installed inside the first member 110 and connected to the cushion pad 140, so the cushion pad 140 can be synchronously moved with the first magnetic component 150 along a Z axle direction. The second member 120 at least has a second magnetic component 160 fixed inside the second member 120.

According to this embodiment of the present invention, when the second member 120 is reversely covered on the first member 110 in the D2 direction, the first magnetic component 150 is attracted by the second magnetic component 160, thus the cushion pad 140 is linked by the first magnetic component 150 to retract into the top surface of the first member 110. At this moment, there is no protruded cushion pad 140 on the outer surface of the foldable electric device 100, thereby it is easier to be carried and held by a user so as to prettify the whole appearance of the foldable electric device.

After that, when the second member 120 is rotated to leave away the bottom surface of the first member 110, the cushion pad 140 is recovered to protrude from the surface of the first member 110, so as to cushion the excessive-exerted force that the second member 120 is slammed on the first member 110.

Based on the same aspect, the design of the cushion pad 140 and the first magnetic component 150 can be reversed, such that when the second member 120 forwardly covers on the first member 110, the cushion pad 140 disposed at the bottom surface of the first member 110 can retract into the first member 110.

Figure 2:
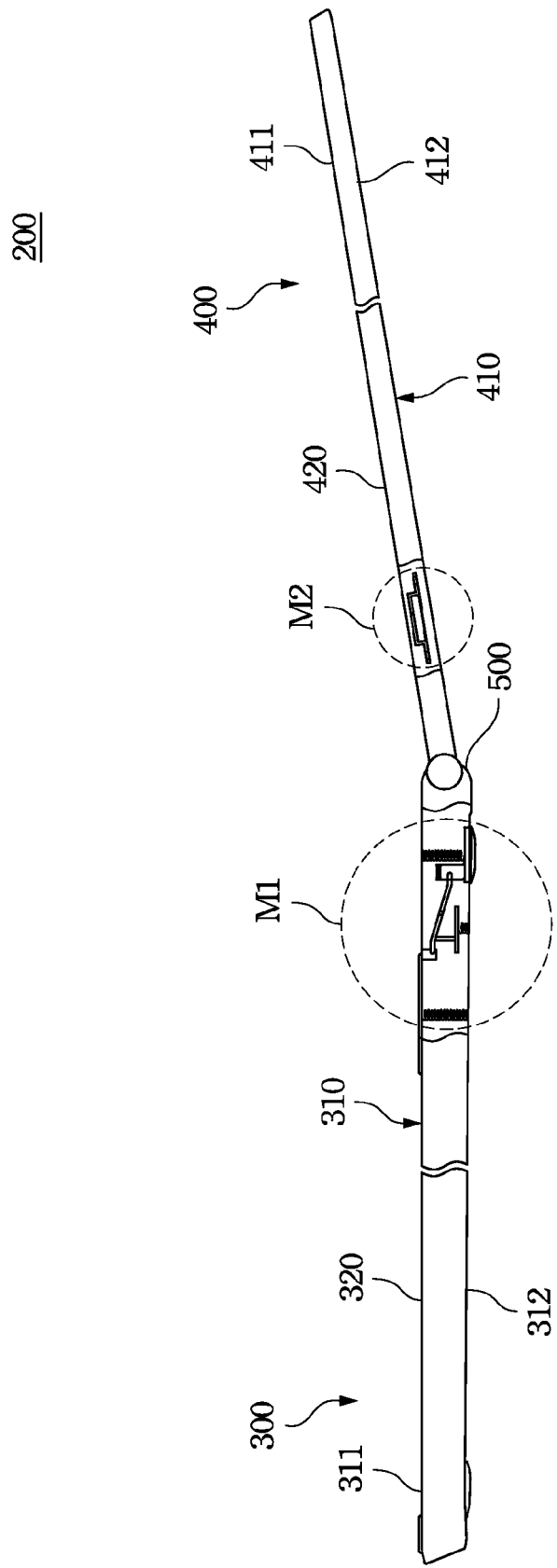
FIG. 2 is a schematic view showing the unfolding state of the foldable electric device, according to one alternative of the first embodiment of the present invention.
Figure 3A:
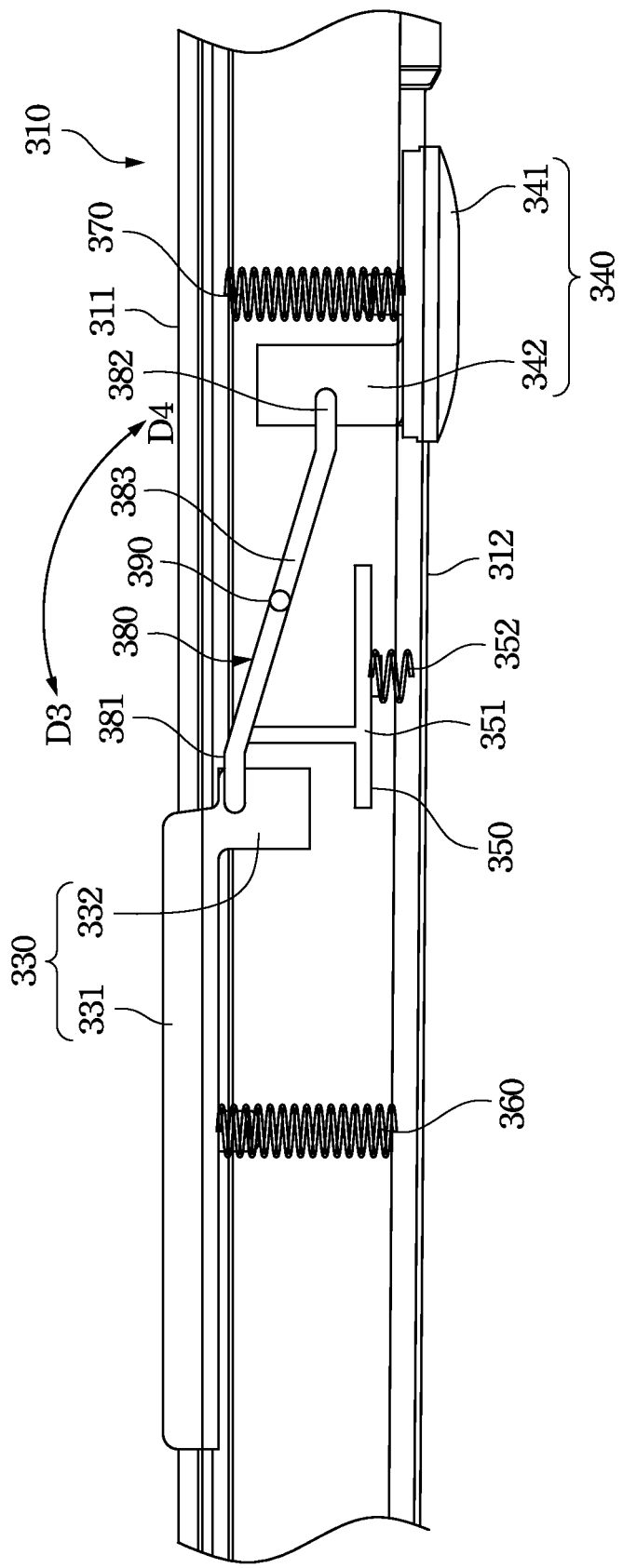
FIG. 3A is a schematic enlarged view showing the zone M1 of FIG. 2.
Figure 3B:
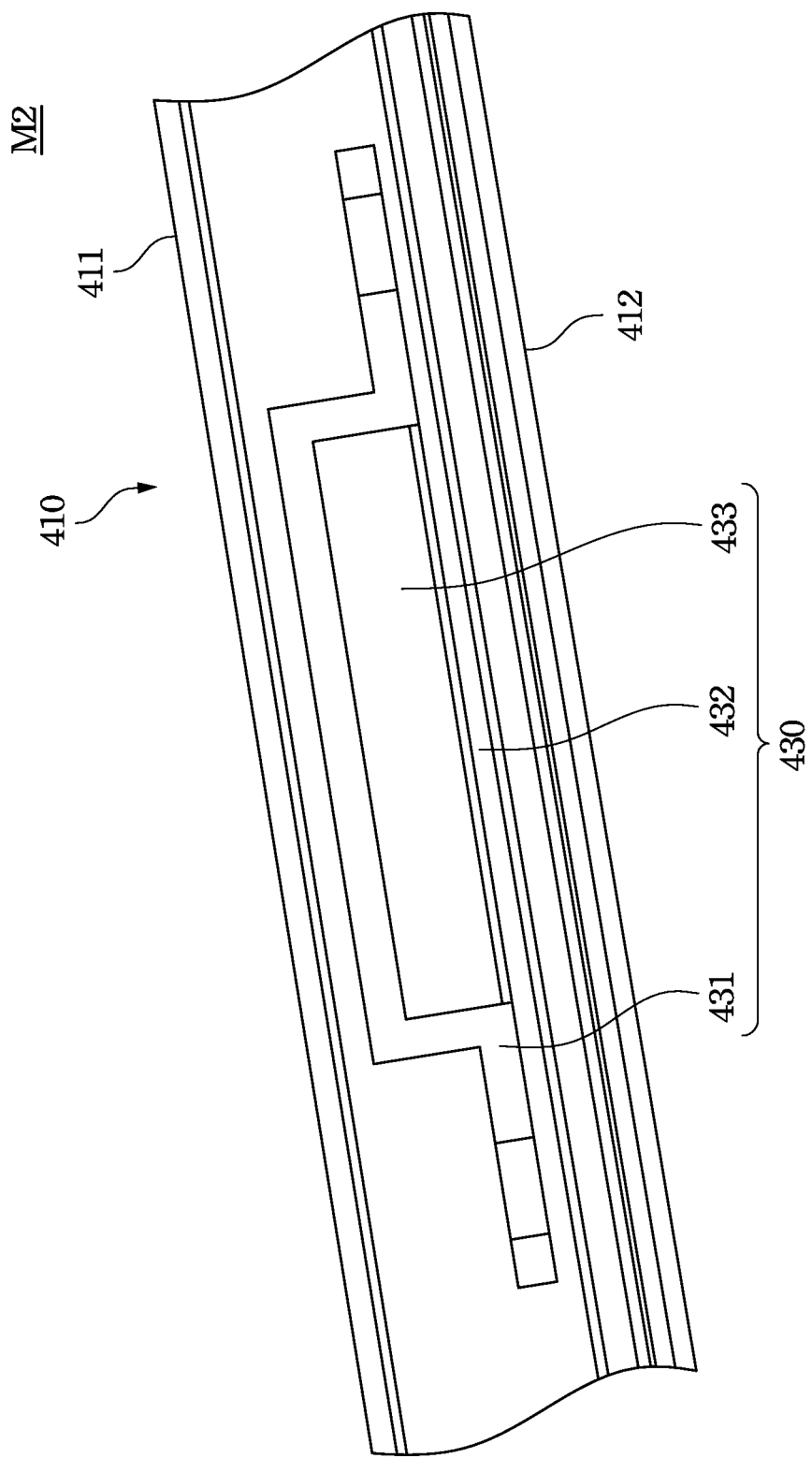
FIG. 3B is a schematic enlarged view showing the zone M2 of FIG. 2.

Referring to FIG. 2, FIG. 3A and FIG. 3B, wherein FIG. 2 is a schematic view showing the unfolding state of the foldable electric device, according to one alternative of the first embodiment of the present invention; FIG. 3A is a schematic enlarged view showing the zone M1 of FIG. 2; and FIG. 3B is a schematic enlarged view showing the zone M2 of FIG. 2.

According to the first embodiment of the present invention, the first member 300 is, for example, a mainframe. The second member 400 is, for example, a monitor. With the pivotal connection by a pivot member 500, the monitor can forwardly or reversely be covered on the mainframe.

Referring to FIG. 2 and FIG. 3A, as an alternative of the present invention, substantially the first member 300 at least comprises a first chassis 310, a first cushion pad 330, a second cushion pad 340, a first magnetic component 350, a first elastic member 360, a second elastic member 370 and a linkage rod 380.

The first chassis 310 has a first surface 311 and a second surface 312 opposite to each other, the first surface 311 has an operation interface (e.g. a keyboard, or touch panel), and the second surface 312 is e.g. a placement surface allowing an electric device 200 to be placed on a plane, e.g. a table surface.

The first cushion pad 330 is retractably disposed on the first surface 311 of the first chassis 310, one side thereof has a working surface 331 capable of moveably protruding from or retracting into the first surface 311 of the first chassis 311, the other side has a connection part 332 installed in the first chassis 310 for connecting with the linkage rod 380. The first elastic member 360 is installed in the first chassis 310 and connected to the interiors of the first cushion pad 330 and the first elastic member 360 is for providing an elastic force to drive the working surface 331 of the first cushion pad 330 to be protruded outwards the first surface 311 of the first chassis 310.

The second cushion pad 340 is retractably disposed on the second surface 312 of the first chassis 310, one side thereof is defined as a working surface 341 capable of movably protruding from or retracting into the second surface 312 of the first chassis 310, the other side is defined as a connection part 342 installed in the first chassis 310 for connecting with the linkage rod 380. The second elastic member 370 is installed in the first chassis 310 and connected to the interiors of the second cushion pad 340 and the second elastic member 370 is for providing an elastic force to drive the working surface 341 of the second cushion pad 340 to be protruded outwards the second surface 312 of the first chassis 310.

The linkage rod 380 is fixed between the first cushion pad 330 and the second cushion pad 340, and comprises a first end 381, a second end 382 and a mid portion 383. The mid portion 383 is defined between the first end 381 and the second end 382, and is pivoted in the first chassis 310 by a pivotal shaft 390, so the linkage rod 380 is enabled to rotate along the pivotal shaft 390 in a counterclockwise direction (D3) or a clockwise direction (D4). The first end 381 of the linkage rod 380 is respectively connected to the connection part 332 of the first cushion pad 330 and the first magnetic component 350, so the first cushion pad 330 and the first magnetic component 350 can be linked by the rotation of linkage rod 380 to synchronously move towards the Z axle direction. The second end 382 of the linkage rod 380 is connected to the connection part 342 of the second cushion pad 340, so the second cushion pad 340 can be linked by the rotation of linkage rod 380 to synchronously move towards the Z axle direction. What shall be addressed is that the direction in which the second cushion pad 340 moves is opposite to the direction in which the first cushion pad 330 moves.

Referring to FIG. 2 and FIG. 3B, the second member 400 comprises a second chassis 410 and a second magnetic component 430. The second chassis 410 has a third surface 411 and a fourth surface 412 opposite to each other. The third surface 411 has a display screen 420, and the third surface 411 can be covered on the first surface 311 when the second member 400 forwardly covers on the first member 300. The fourth surface 412 can be covered on the second surface 312 when the second member 400 reversely covers on the first member 300. The second magnetic component 430 is fixed inside the second chassis 410, and preferably the second magnetic component 430 is fixed in the second chassis 410 and close to the fourth surface 412; or the second magnetic component 430 is disposed on the fourth surface 412 of the second chassis 410, and the location thereof is preferably to be corresponding to the first magnetic component 350.

Figure 4:
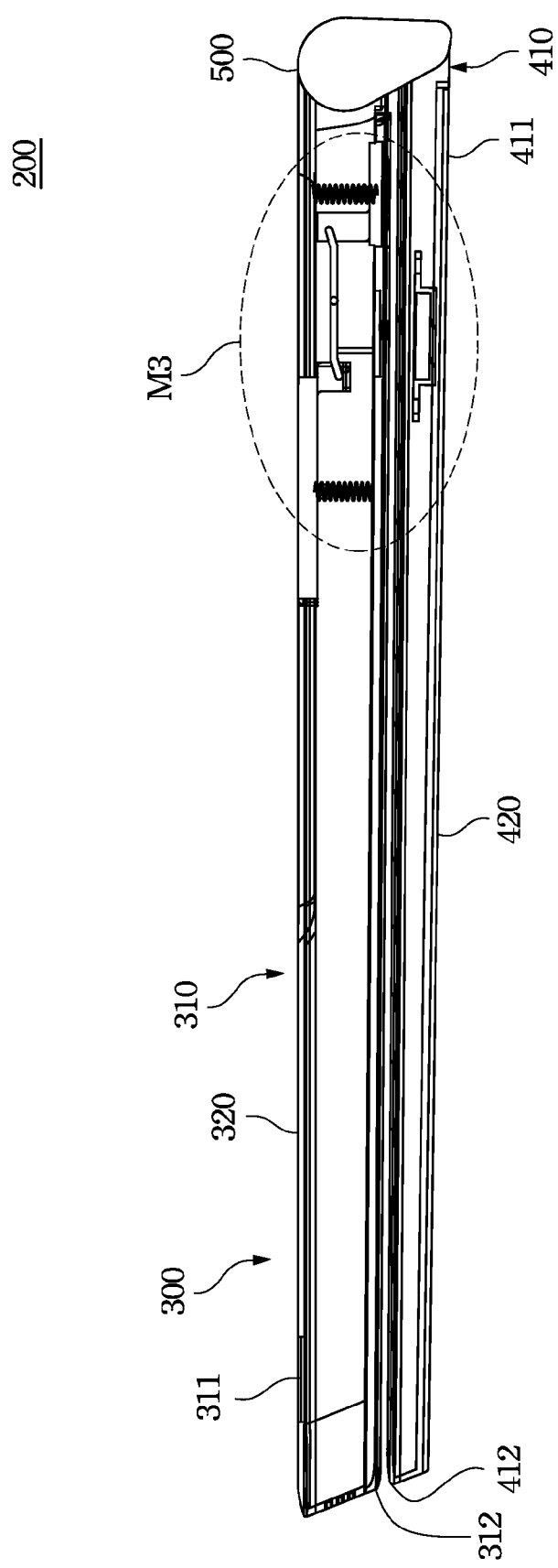
FIG. 4 is a schematic view showing the foldable electric device under a reversely covering state according to the alternative of the first embodiment of the present invention.
Figure 5:
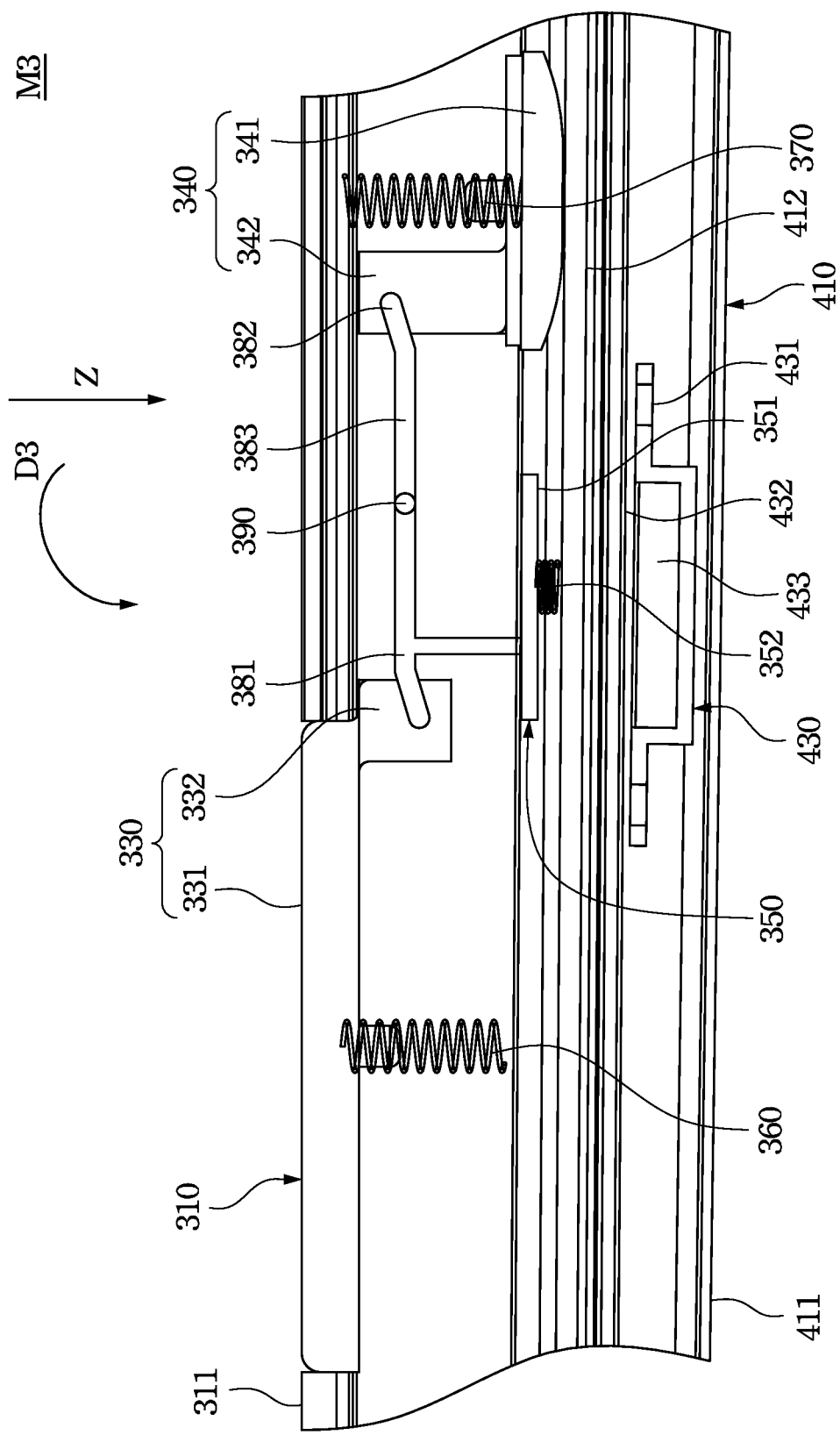
FIG. 5 is a schematic enlarged view showing the zone M3 of FIG. 4.

Referring to FIG. 4 and FIG. 5, wherein FIG. 4 is a schematic view showing the foldable electric device under a reversely covering state according to the alternative of the first embodiment of the present invention; and FIG. 5 is a schematic enlarged view showing the zone M3 of FIG. 4.

When the second chassis 410 reversely covers on the first chassis 310, and the operation interface 320 is opposite to the display screen 420, with the magnetic attraction force between the first magnetic component 350 and the second magnetic component 430, the first magnetic component 350 is moved towards the second magnetic component 430, and the first cushion pad 330 is driven to synchronously retract under the first surface 311 of the first chassis 310 along the Z axle direction. At this moment, the first end 381 of the linkage rod 380 is also driven by the first magnetic component 350 to rotate towards the D3 direction, and the second end 382 of the linkage rod 380 also synchronously rotates towards the D3 direction, thereby synchronously driving the second cushion pad 340 to retract inwards the second surface 312 of the first chassis 310 along the Z axle direction. As such, during the second chassis 410 reversely covers on the first chassis 310, the second cushion pad 340 retracts under the first chassis 310, so the first member 300 and the second member 400 can be more tightly covered with each other. In addition, because the first cushion pad 330 and the second cushion pad 340 both retract inwards the first chassis 310, the corresponding elastic members 360, 370 respectively generate an elastic recovery force.

After the second chassis 410 is reversely covered on the first chassis 310, and when the second chassis 410 is rotated to leave the first chassis 310, with the elastic recovery force provided by each elastic member 360, 370, the working surface 331 of the first cushion pad 330 can be protruded outwards the first surface 311 of the first chassis 310, the working surface 341 of the second cushion pad 340 can be protruded outwards the second surface 312 of the first chassis 310. As such, the second cushion pad 340 can again act as a cushion for the excessive-exerted force generated by the second surface 132 of the foldable electric device being placed on a table surface, i.e. the second surface 312 is prevented from being in direct contact with the table surface, thereby avoiding worn damage; and the first cushion pad 330 can again act as a cushion for the excessive-exerted force generated by the second member 400 slamming on the first member 300.

Figure 6A:
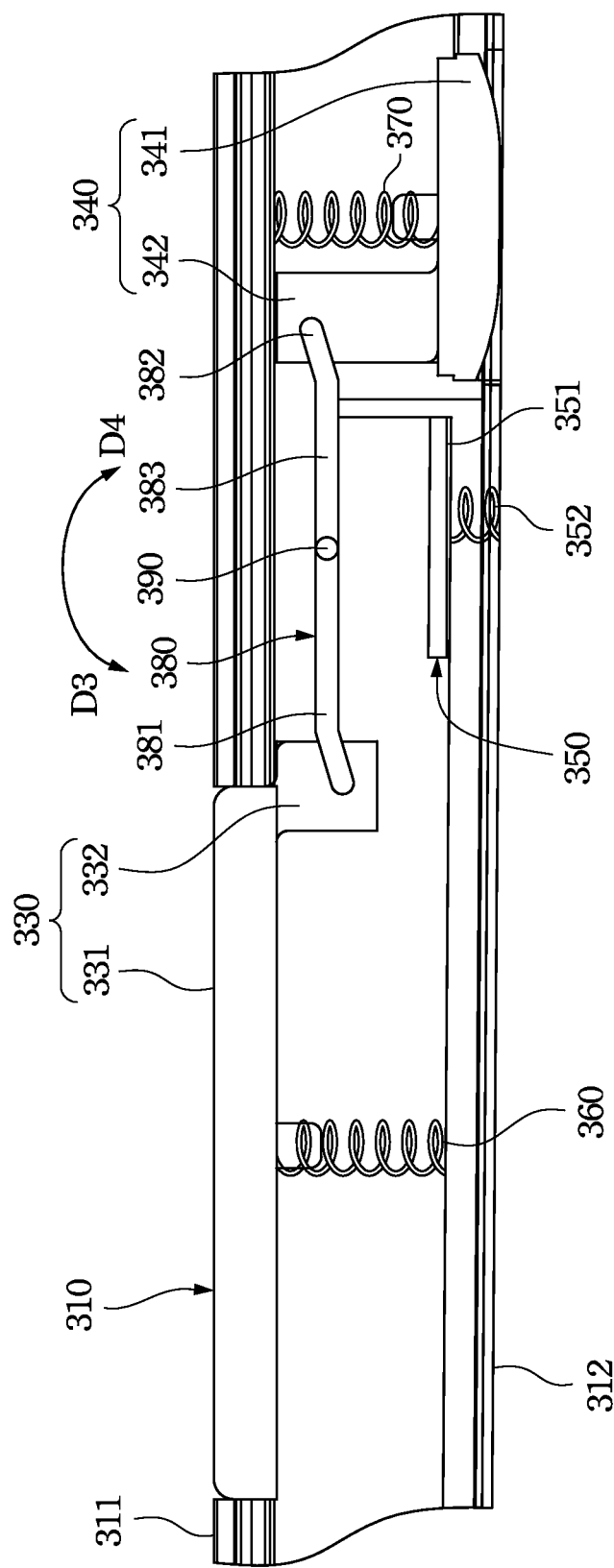
FIG. 6A is a schematic partial view showing the unfolding state of the foldable electric device, according to another alternative of the present invention.
Figure 6B:
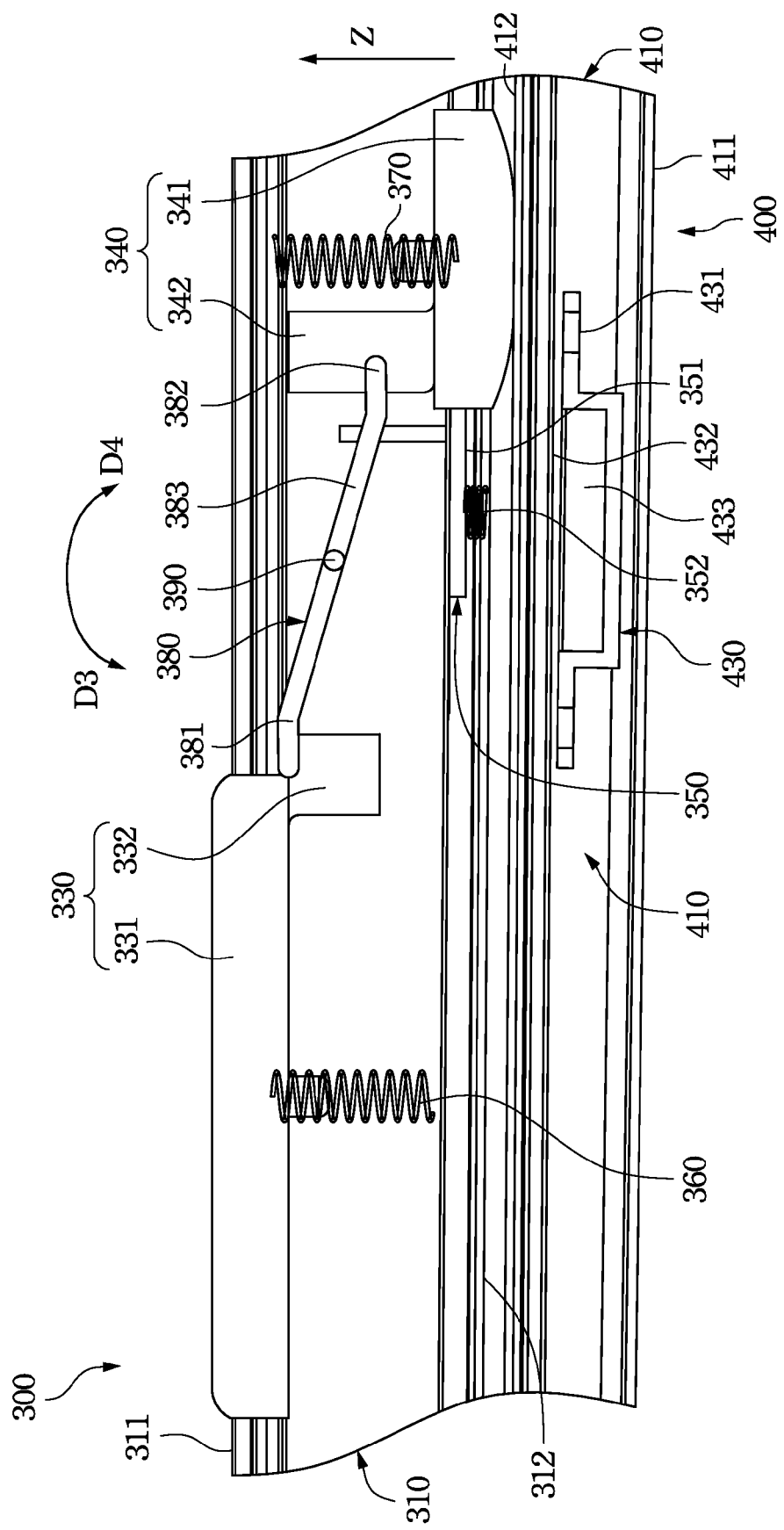
FIG. 6B is a schematic partial view showing the foldable electric device under a reversely covering state according to another alternative of the present invention.

Referring to FIG. 6A and FIG. 6B, wherein FIG. 6A is a schematic partial view showing the unfolding state of the foldable electric device, according to another alternative of the present invention; and FIG. 6B is a schematic partial view showing the foldable electric device under a reversely covering state according to another alternative of the present invention.

As shown in FIG. 6A, according to one alternative of the first embodiment of the present invention, the first cushion pad 330 is retractably disposed on the first surface 311 of the first chassis 310, one side thereof has a working surface 331 capable of moveably protruding from or retracting into the first surface 311 of the first chassis 310, the other side has a connection part 332 installed inside the first chassis 310 for connecting with the linkage rod 380. The first elastic member 360 is installed in the first chassis 310 and connected to the first cushion pad 330 and the interiors (e.g. internal component or inner wall of the first chassis 310) of the first chassis 310 for providing an elastic force to drive the working surface 331 of the first cushion pad 330 to retract into the first surface 311 of the first chassis 310.

The second cushion pad 340 is retractably disposed on the second surface 312 of the first chassis 310, one side thereof is defined as a working surface 341 capable of movably protruding from or retracting into the second surface 312 of the first chassis 310, the other side is defined as a connection part 342 installed in the first chassis 310 for connecting with the linkage rod 380. The second elastic member 370 is installed in the first chassis 310 and connected to the second cushion pad 340 and the interiors (e.g. internal component or inner wall of the first chassis 310) of the first chassis 310 for providing an elastic force to drive the working surface 341 of the second cushion pad 340 to retract into the second surface 312 of the first chassis 310.

The linkage rod 380 comprises a first end 381, a second end 382 and a mid portion 383. The mid portion 383 is defined between the first end 381 and the second end 382, and is pivoted in the first chassis 310 by a pivotal shaft 390, so the linkage rod 380 is enabled to rotate along the pivotal shaft 390 in a counterclockwise direction (D3) or a clockwise direction (D4). The first end 381 of the linkage rod 380 is connected to the connection part 332 of the first cushion pad 330, so the first cushion pad 330 can be linked by the rotation of the linkage rod 380 to synchronously move towards the Z axle direction. The second end 382 of the linkage rod 380 is respectively connected to the connection part 342 of the second cushion pad 340 and the first magnetic component 350, so the second cushion pad 340 can be linked by the rotation of the linkage rod 380 to synchronously move towards the Z axle direction.

Referring to FIG. 6A and FIG. 6B, the second member 400 comprises a second chassis 410 and a second magnetic component 430. The second chassis 410 has a third surface 411 and a fourth surface 412 opposite to each other. A display screen 420 (as shown in FIG. 4) is disposed on the third surface 411, and the third surface 411 can be covered on the first surface 311 when the second member 400 forwardly covers on the first member 300. The fourth surface 412 can be covered on the second surface 312 when the second member 400 reversely covers on the first member 300. The second magnetic component 430 is fixed in the second chassis 410, and preferably the second magnetic component 430 is disposed in the second chassis 410 and close to the fourth surface 412; or the second magnetic component 430 is disposed on the fourth surface 412 and the location thereof is preferably to be corresponding to the first magnetic component 350.

When the second chassis 410 reversely covers on the first chassis 310 (as shown in FIG. 6B), with the magnetic attraction force between the first magnetic component 350 and the second magnetic component 430, the first magnetic component 350 is moved towards the second magnetic component 430, and the second cushion pad 340 is linked to synchronously protrude from the second surface 312 of the first chassis 310 along the Z axle direction. At this moment, the second end 382 of the linkage rod 380 is also driven by the first magnetic component 350 to synchronously rotate towards the D4 direction, and the first end 381 of the linkage rod 380 also synchronously rotates towards the D4 direction, thereby synchronously driving the first cushion pad 330 to protrude from the first surface 311 of the first chassis 310 along the Z axle direction. As such, the second cushion pad 340 cushions the excessive exerting force of the second member 400 covering on the first member 300, and the first cushion pad 330 generates a function of preventing the excessive extent of the first surface 311 being placed on the table surface. In addition, because the first cushion pad 330 and the second cushion pad 340 both protrude from the first chassis 310, the corresponding elastic members 360, 370 respectively generate an elastic recovery force.

When the second chassis 410 is rotated to leave the first chassis 310 after the second chassis 410 is reversely covered on the first chassis 310, with the elastic recovery force provided by each elastic member 360, 370, the working surface 331 of the first cushion pad 330 can be retracted into the first chassis 310, the working surface 341 of the second cushion pad 340 can be retracted into the first chassis 310. As such, the first cushion pad 330 and the second cushion pad 340 are respectively retracted into the first chassis 310, thereby it achieves a design for better appearance.

According to actual needs, the present invention can alter the priority of appearance design and cushioning function, such as the appearance design is the main consideration, then other requirements are correspondingly met with respect to the mentioned embodiment, therefore different functions can be provided through relocating the positions of each component.

In each alternative of the first embodiment, the first member 300 can be optionally provided with a third elastic member 352 (as shown in FIG. 3A and FIG. 5). The third elastic member 352 is installed in the first chassis 310, and connected to the first magnetic component 350 and the interiors of the first chassis 310, for providing an elastic force to drive the first magnetic component 350 back to its original position.

Moreover, in each alternative of the first embodiment, the first magnetic component 350 can be preferably provided with a magnetic surface 351; when the first member 310 and the second member 410 are reversely engaged, the magnetic surface 351 directly faces the second magnetic component 430, for increasing the magnetic attraction effect between the first magnetic component 350 and the second magnetic component 430 so as to overcome the elastic member and drive the linkage rod 380.

What shall be defined is that one of the first magnetic component 350 and the second magnetic component 430 is a magnet component, such as a permanent magnet (natural magnet stone), or non-permanent magnet (electromagnet)

When the first magnetic component 350 and the second magnetic component 430 are both magnet components, the first magnetic component 350 and the second magnetic component 430 are magnetically attracted with each other. When one of the first magnetic component 350 and the second magnetic component 430 is a metal component capable of being magnetically attracted by magnetic force, the metal component is, for example, steel, iron, cobalt, nickel, copper or zinc; or an alloy of the above or a component coated with the mentioned metals.

In addition, when the second magnetic component 430 is a magnet component, the second magnetic component comprises a metal case 431 and a magnet 433. The metal case 431 is disposed in the second chassis and has an opening 432. The magnet 433 is disposed in the metal case 431, one side thereof is exposed outside the opening 432 of the metal case 431, and aligned with the first magnetic component 350 when the first chassis 310 and the second chassis 410 are reversely covered with each other.

Figure 7A:
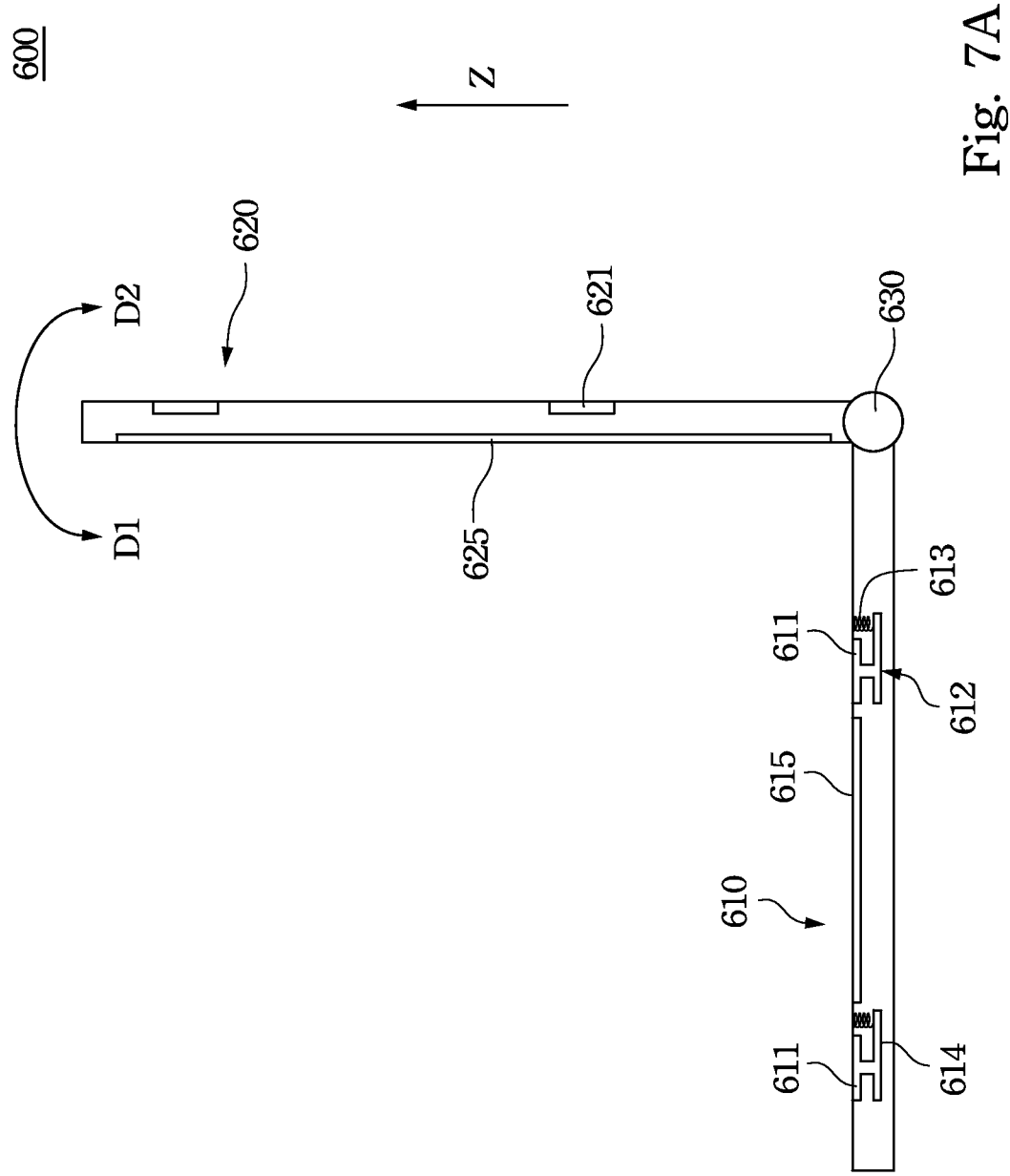
FIG. 7A is a schematic view showing the unfolding state of the foldable electric device, according to the second embodiment of the present invention.
Figure 7B:
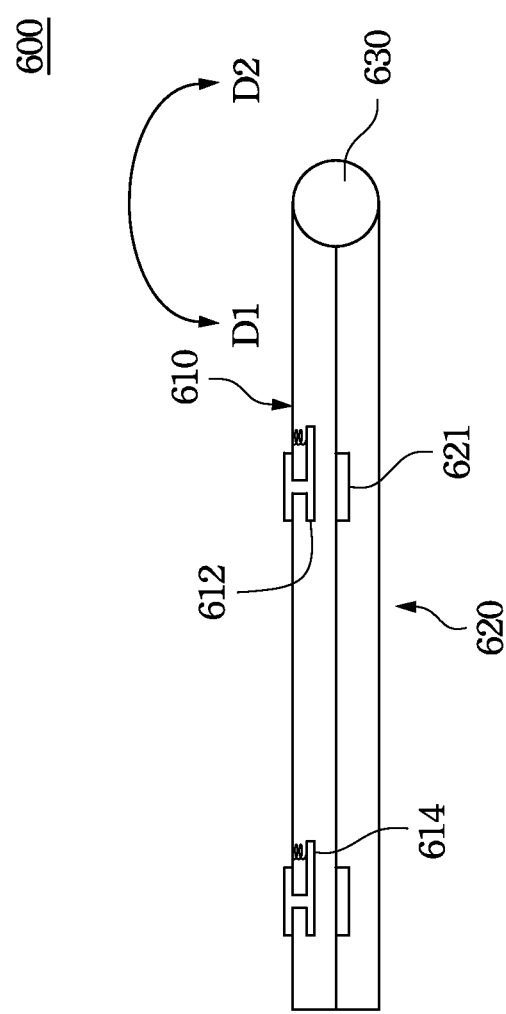
FIG. 7B is a schematic view showing the foldable electric device under a reversely covering state according to the second embodiment of the present invention.

Referring to FIG. 7A and FIG. 7B, wherein FIG. 7A is a schematic view showing the unfolding state of the foldable electric device, according to the second embodiment of the present invention; and FIG. 7B is a schematic view showing the foldable electric device under a reversely covering state according to the second embodiment of the present invention.

According to the second embodiment of the present invention, the foldable electric device 600 comprises a first member 610, a second member 620 and a pivot portion 630. The pivot portion 630 is used to pivot the first member 610 and the second member 620. As such, the second member 620 can be pivotally rotated to cover on the first member 610, or the second member 620 can be pivotally rotated to leave away from the first member 610 (as sown in FIG. 7A). Substantially, the second member 620 can pivotally rotate in a counterclockwise direction (D1) for forwardly covering on a top surface of the first member 610 (not shown in figures), or the second member 620 can pivotally rotate in a clockwise direction (D2) for reversely covering on the bottom surface of the first member 610 (as shown in FIG. 7B).

The first member 610 at least has an operation interface 615 (e.g. a keyboard or touch panel), a cushion pad 611, a first magnetic component 612 and an elastic member 613. The operation interface 615 is disposed on a surface of the first member 610. The cushion pad 611 is retractably disposed on the top surface of the first member 610, so the cushion pad 611 can be protruded from or retract into the top surface of the first member 610. The first magnetic component 612 is installed inside the first member 610, and connected to the cushion pad 611, so the cushion pad 611 can be synchronously moved with the first magnetic component 612 along the Z axle direction. The elastic member 613 is disposed inside the first member 610, and connected to the first magnetic component 612 and the interiors (e.g. internal component or inner wall of the first member 610) of the first member 610, for providing an elastic force to drive the cushion pad 611 to return back in the first member 610.

The second member 620 at least has a display screen 625 and a second magnetic component 621. The display screen 625 is installed on a surface of the second member 620. The second magnetic component 621 is fixed in the second member 620; preferably the second magnetic component 621 is disposed on a surface of the second member 620 which is opposite to the display screen 625.

As such, when the second member 620 reversely covers on the bottom surface of the first member 610 towards the D2 direction, so the operation interface 615 is opposite to the display screen 625. At this moment, because the first magnetic component 612 can induce the second magnetic component 621 and is magnetically repelled by the second magnetic component 621, the cushion pad 611 is driven by the first magnetic component 612 to protrude from the top surface of the first member 610. When the second member 620 is rotated to leave the first member 610 after the second member 620 is reversely covered on the first member 610, the elastic member 613 keeps the cushion pad 611 to remain inside the first member 610.

Moreover, according to the second embodiment of the present invention, the first magnetic component 612 is preferably provided with a magnetic surface 614 to enhance the magnetically reaction effect of the first magnetic component 612 and the second magnetic component 621 when the first member 610 and the second member 620 are reversely covered with each other.

The first magnetic component 612 and the second magnetic component 621 are both magnet components having the same magnetism, so the first magnetic component 612 and the second magnetic component 621 are magnetically repelled with each other. The magnet component is, for example, a permanent magnet (natural magnet stone), or non-permanent magnet (electromagnet).

As such, when the first member 610 and the second member 620 are reversely covered with each other, so as to arrange the operation interface 615 being opposite to the display screen 622, the cushion pad 611 is protruded from the surface of the first member 610, the foldable electric device 600 can be stably placed on a placement plane with the protruded cushion pad 611, thereby providing convenience for users to watch the display screen 622.

Based on what is mentioned above, the foldable electric device disclosed in the aforesaid embodiments is not limited to certain type of electric device, the foldable electric device of the present invention can be, e.g. but not limited to, a notebook computer, mobile phone, video recorder, game player, language translator.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present invention has been described with reference to the preferred embodiments thereof, it is apparent to those skilled in the art that a variety of modifications and changes may be made without departing from the scope of the present invention which is intended to be defined by the appended claims.

The readers attention is directed to all papers and documents which are filed concurrently with this specification and which are open to public inspection with this specification, and the contents of all such papers and documents are incorporated herein by reference.

All the features disclosed in this specification (comprising any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A foldable electric device, comprising:
    a first member, comprising:
        a first chassis;
        a first cushion pad retractably disposed on a surface of the first chassis; and
        a first magnetic component installed in the first chassis, and synchronously moved with the first cushion pad;
    a second member, comprising:
        a second chassis; and
        a second magnetic component fixedly installed in the second chassis; and
    a pivot portion pivotally disposed on both the first chassis and the second chassis, such that the first chassis and the second chassis are able to forwardly or reversely cover with each other,
    wherein when the second chassis is reversely covered on the first chassis, by the magnetic effect between the first magnetic component and the second magnetic component, the first cushion pad is linked by the first magnetic component to protrude outwardly from the first chassis or retract into the first chassis.

2. The foldable electric device according to claim 1, wherein the first member further comprises:
    a first elastic member disposed in the first chassis and connected to the first cushion pad and an interior of the first chassis.

3. The foldable electric device according to claim 2, wherein the first magnetic component and the second magnetic component are attracted magnetically with each other,
    wherein when the second chassis is reversely covered on the first chassis, the first cushion pad is linked by the first magnetic component to retract into the first chassis, and when the second chassis is pivoted to leave the first chassis after the second chassis is reversely covered on the first chassis, the first cushion pad protrudes from the first chassis.

4. The foldable electric device according to claim 3, wherein the first member further comprises:
    a second cushion pad retractably disposed on a surface of the first chassis opposite to the first cushion pad; and
    a second elastic member installed in the first chassis, connected to the second cushion pad and an interior of the first chassis.

5. The foldable electric device according to claim 4, wherein the first member further comprises:
    a linkage rod, comprising:
        a first end synchronously moved with the first magnetic component and the first cushion pad;
        a second end synchronously moved with the second cushion pad; and
        a mid portion defined between the first end and the second end; and
    a pivotal shaft connected with the mid portion of the linkage rod and the first chassis, such that the mid portion of the linkage rod is pivotally disposed on the first chassis.

6. The foldable electric device according to claim 2, wherein the first magnetic component and the second magnetic component are repelled magnetically with each other,
    when the second chassis is reversely covered on the first chassis, the first cushion pad is linked by the first magnetic component to protrude from the first chassis, and when the second chassis is pivoted to leave the first chassis after the second chassis is reversely covered on the first chassis, the first cushion pad retracts inside the first chassis.

7. The foldable electric device according to claim 6, wherein first member further comprises:
    a second cushion pad retractably disposed on a surface of the first chassis opposite to the first cushion pad; and
    a second elastic member disposed in the first chassis, connected to the second cushion pad and an interior of the first chassis.

8. The foldable electric device according to claim 7, wherein first member further comprises:
    a linkage rod, comprising:
        a first end synchronously moved with the first magnetic component and the first cushion pad;
        a second end synchronously moved with the second cushion pad; and
        a mid portion defined between the first end and the second end; and
    a pivotal shaft connected with the mid portion of the linkage rod and the first chassis, such that the mid portion of the linkage rod is pivotally disposed on the first chassis.

9. The foldable electric device according to claim 1, wherein the second magnetic component comprises:
    a metal case installed in the second chassis, having an opening; and
    a magnet disposed in the metal case, one surface thereof is exposed outside the opening of the metal case, and faces the first magnetic component when the second chassis is reversely covered on the first chassis.

10. The foldable electric device according to claim 1, wherein the first member further comprises:
    an operation interface disposed on an outer surface of the first chassis; and
    the second member further comprises:
    a display screen disposed on an outer surface of the second chassis,
    wherein the operation interface is opposite to the display screen when the second chassis is reversely covered on the first chassis.

* * * * *